(12) United States Patent
Knevels

(10) Patent No.: US 7,743,897 B2
(45) Date of Patent: Jun. 29, 2010

(54) ROD ASSEMBLY WELD

(75) Inventor: Luc Knevels, Houthalen-Helchteren (BE)

(73) Assignee: Tenneco Automotive Operating Company Inc., Lake Forest, IL (US)

( * ) Notice: Subject to any disclaimer, the term of this patent is extended or adjusted under 35 U.S.C. 154(b) by 0 days.

(21) Appl. No.: 11/787,447

(22) Filed: Apr. 16, 2007

(65) Prior Publication Data

US 2008/0251333 A1 Oct. 16, 2008

(51) Int. Cl.
*F16F 9/50* (2006.01)
(52) U.S. Cl. .............. 188/322.15; 188/315; 219/121.64
(58) Field of Classification Search ............ 188/322.12, 188/322.15–322.22, 315; 267/120, 124, 267/64.12; 403/260, 261; 219/121.13–121.14, 219/121.45–121.46, 121.63–121.64
See application file for complete search history.

(56) References Cited

U.S. PATENT DOCUMENTS

| 2,467,098 | A | * | 4/1949 | Rossman | 137/493.8 |
| 2,670,814 | A | * | 3/1954 | Ball | 188/315 |
| 3,954,256 | A | * | 5/1976 | Keijzer et al. | 267/64.21 |
| 4,398,744 | A | * | 8/1983 | Schoppel et al. | 280/504 |
| 4,934,491 | A | * | 6/1990 | Yamaoka et al. | 188/322.15 |
| 2005/0133319 | A1 | * | 6/2005 | Wilhelm | 188/281 |
| 2006/0043076 | A1 | * | 3/2006 | Larsson et al. | 219/121.64 |
| 2006/0163834 | A1 | * | 7/2006 | Brereton et al. | 280/124.128 |

* cited by examiner

*Primary Examiner*—Christopher P Schwartz
(74) *Attorney, Agent, or Firm*—Harness, Dickey & Pierce, PLC

(57) ABSTRACT

A shock absorber includes a welded piston rod assembly. The piston rod assembly comprises an upper piston rod portion welded to a lower piston rod portion and a dirt shield welded to both of the upper piston rod portion and the lower piston rod portion using a single weld.

20 Claims, 3 Drawing Sheets

ROD ASSEMBLY WELD

FIELD

The present disclosure relates to hydraulic dampers or shock absorbers. More particularly, the present disclosure relates to a hydraulic damper or shock absorber which includes a dust shield which is secured to the piston rod using a single welding operation.

BACKGROUND

The statements in this section merely provide background information related to the present disclosure and may not constitute prior art.

Shock absorbers are used in conjunction with automobile suspension systems and other vehicle suspension systems to absorb unwanted vibrations which occur during operation of the vehicle. To absorb this unwanted vibration, shock absorbers are connected between the sprung mass (the body) and the unsprung mass (the suspension system) of the vehicle. A piston is located within a pressure tube of the shock absorber and is connected to the sprung mass of the vehicle. The pressure tube is connected to the unsprung mass of the vehicle and is normally filled with hydraulic fluid. Because the piston has the capability to limit the flow of hydraulic fluid within the pressure tube when the shock absorber is compressed or extended, the shock absorber is able to produce a damping force which counteracts the vibrations which would otherwise be transmitted from the suspension (unsprung mass) to the body (sprung mass) of the vehicle.

A conventional mono tube shock absorber comprises a pressure tube with a piston disposed therein. A piston rod is connected to the piston and it extends through the upper end of the pressure tube. The damping forces are created by the restricted flow of fluid through fluid passages and valving in the piston which regulates passage of fluid between opposite sides of the piston within the working chamber.

Due to the piston rod being located on only one side of the piston, a larger amount of fluid is displaced in the lower working chamber than the fluid that is displaced in the upper working chamber. The difference in the amount of fluid is termed the rod volume and this difference is typically accommodated for by an additional piston in the working chamber that separates the fluid in the working chamber from a gas chamber usually disposed below the additional piston.

A conventional dual tube shock absorber comprises a pressure tube with a piston disposed therein and a reserve tube surrounding the pressure tube. A piston rod is connected to the piston and it extends through the upper end of the pressure and reserve tubes. At the lower end of the pressure tube, a base valve is located between the pressure tube and the reserve tube. The base valve controls fluid flow between the working chamber defined by the pressure tube and the reserve chamber defined by the reserve tube. The damping force is created by the restricted flow of fluid through passages and valving in the piston which regulate passage of fluid between opposite sides of the piston within the working chamber and by the restricted flow of fluid through passages and valving in the base valve which regulate passage of fluid between opposite sides of the base valve between the working chamber and the reserve chamber.

Due to the piston rod being located on only one side of the piston, a different amount of fluid is displaced on the compression stroke as opposed to the rebound stroke. The difference in the amount of fluid is termed the rod volume. The rod volume of fluid is pushed out of the pressure tube, through the base valve and into the reserve tube during a compression stroke. During a rebound stroke, the rod volume of fluid flows in the opposite direction from the reserve tube, through the base valve and into the pressure tube.

The piston rod is supported at its lower end by the piston and is slidingly received at the upper end of the shock absorber by a rod guide. The piston rod guide thus functions as a slide bearing for the piston rod. The rod guide properly positions the piston rod within the pressure tube and also acts as a closure member for both the pressure tube and the reserve tube. In order for the smooth sliding of the piston rod through the rod guide, a slight clearance is formed between the inner periphery of the bearing portion of the rod guide and the outer periphery of the piston rod. This slight clearance allows for the hydraulic fluid to lubricate the interface between the piston rod and the rod guide.

Shock absorbers typically include a dirt shield which is a metal skirt which is attached to an upper portion of the piston rod and extends down over the pressure tube in a mono-tube design and down over the reserve tube in a dual-tube shock absorber when the shock absorber is in a compressed condition. When the shock absorber extends in length, the dirt shield travels with the piston rod to cover the exposed portion of the piston rod. The covering of the exposed portion of the piston rod helps to prevent dirt and other contaminants from contacting and possibly sticking to the piston rod. This dirt and other contaminants could cause damage to the sealing system of the shock absorber during a subsequent compression stroke of the shock absorber.

Typical piston rods are a two-piece welded assemblies where the upper stem or attachment loop is resistance or friction welded to the lower portion of the shock absorber. When a dirt shield is included, it is welded at the same time and in the same position as the resistance or friction weld. This provides for the welding of the three components in one weld operation.

In a number of higher load applications, this single weld operation welded component cannot meet the durability requirements in relation to static and dynamic loads due to the disturbed area at the weld. In order to improve the durability and the resistance to these higher static and dynamic loads, the typical solution is to add a first metal inert gas (MIG) weld or a first metal active gas (MAG) weld between the dirt shield and the upper stem or attachment loop and a second MIG weld or a second MAG weld between the dirt shield and the lower portion of the piston rod. This increases the single-weld operation to a three-weld operation.

SUMMARY

The present disclosure increases the strength and thus the durability of the piston rod to resist these higher static and dynamic loads using a two-weld process. The first welding process resistance or friction welds the upper stem or attachment loop to the lower portion of the piston rod. The second welding process is a MIG or MAG weld that covers the previous weld and simultaneously welds the upper stem or attachment loop, the lower portion of the piston rod and the dirt shield.

This two-step welding process completely seals the connection between the upper stem or the attachment loop and the dirt shield to eliminate rust bleeding between the upper stem or attachment loop and the dirt shield. It simplifies the spray painting of the finished shock absorber by providing a smaller Farady cage effect. It is also a lower cost process due to the elimination of a welding step. It has superior static and dynamic strength as the piston rod can be completely ground smooth to the interface of the upper stem or attachment loop. The addition of the MIG/MAG all around the piston rod completely covers any initial notch that may remain after a resistance or friction weld. Finally, since the piston rod of the present disclosure only includes a MIG/MAG weld above the dirt shield, the lower portion of the piston rod which strokes into the pressure chamber past the sealing system can remain free of any weld spatter which may damage the sealing system.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
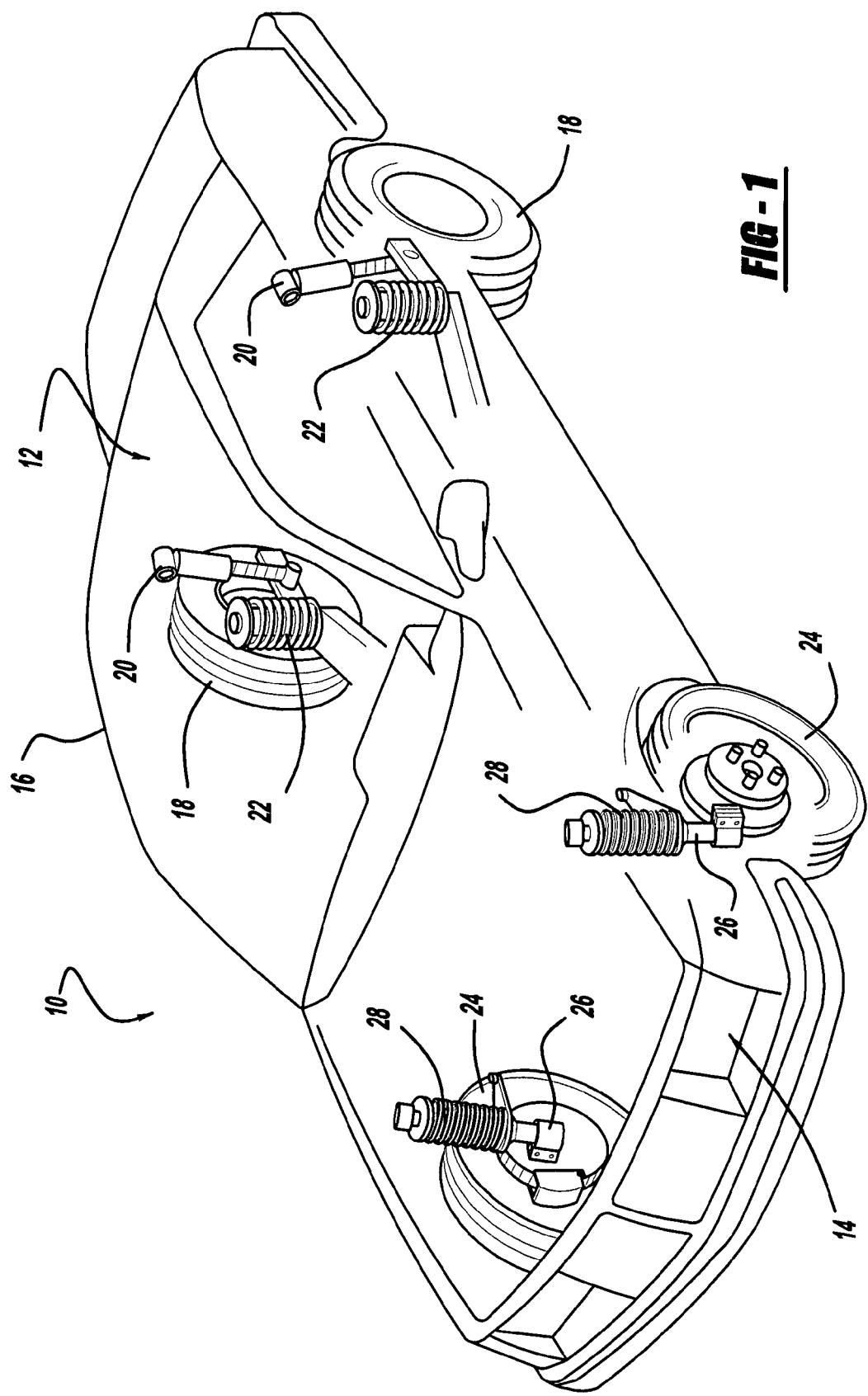
FIG. 1 is a schematic representation of an automobile which includes shock absorbers incorporating the welded piston rod in accordance with the present disclosure.

The following description is merely exemplary in nature and is not intended to limit the present disclosure, application, or uses. Referring now to the drawings in which like reference numerals designate like or corresponding parts throughout the several views, there is shown in FIG. 1, a vehicle incorporating shock absorbers which include the improved rod assembly weld in accordance with the present disclosure which is designated generally by the reference numeral 10. Vehicle 10 includes a rear suspension system 12, a front suspension system 14 and a body 16. Rear suspension system 12 includes a pair of rear suspension arms adapted to operatively support a pair of rear wheels 18. Each rear suspension arm is attached to body 16 by means of a shock absorber 20 and a helical coil spring 22. Similarly, front suspension system 14 includes a pair of suspension arms adapted to operatively support a pair of front wheels 24. Each suspension arm is attached to body 16 by means of a shock absorber 26 and a helical coil spring 28. Rear shock absorbers 20 and front shock absorbers 26 serve to dampen the relative movement of the unsprung portion of vehicle 10 (i.e., front and rear suspension systems 12, 14) with respect to the sprung portion (i.e., body 16) of vehicle 10. While vehicle 10 has been depicted as a passenger vehicle having independent front and rear suspension systems 12, 14, shock absorbers 20 and 26 may be used with other types of vehicles having other types of suspensions and springs or in other types of applications including, but not limited to, vehicles incorporating air springs, leaf springs, non-independent front and/or non-independent rear suspension systems. Further, the term "shock absorber" as used herein is meant to refer to dampers in general and thus will include MacPherson struts, spring seat units as well as other shock absorber designs known in the art.

Figure 2:
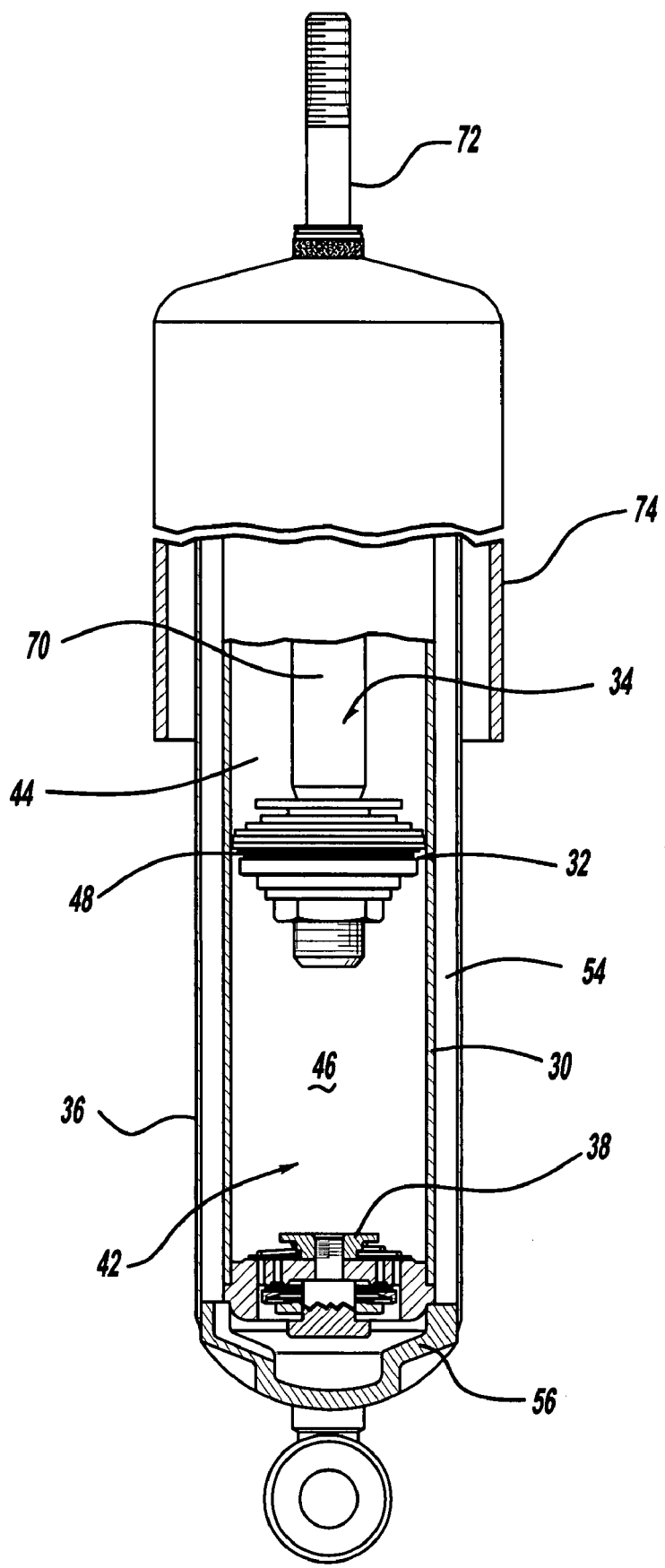
FIG. 2 is a side elevational view, partially in cross-section, of a shock absorber incorporating the welded piston rod in accordance with the present disclosure.

Referring now to FIG. 2, rear shock absorber 20 is shown in greater detail. While FIG. 2 shows only rear shock absorber 20, it is to be understood that front shock absorber 26 is also designed to include the dynamic vibration absorber in accordance with the present disclosure. Front shock absorber 26 only differs from rear shock absorber 20 in the way it is adapted to be connected to the sprung and unsprung portions of vehicle 10. Shock absorber 20 comprises a pressure tube 30, a piston assembly 32, a piston rod assembly 34, a reserve tube 36 and a base valve assembly 38.

Pressure tube 30 defines a working chamber 42. Piston assembly 32 is slidably disposed within pressure tube 30 and divides working chamber 42 into an upper working chamber 44 and a lower working chamber 46. A seal 48 is disposed between piston assembly 32 and pressure tube 30 to permit sliding movement of piston assembly 32 with respect to pressure tube 30 without generating undue frictional forces as well as sealing upper working chamber 44 from lower working chamber 46. Piston rod assembly 34 is attached to piston assembly 32 and extends through upper working chamber 44 and through an upper rod guide (not shown) which closes the upper end of both pressure tube 30 and reserve tube 36. A sealing system seals the interface between the upper rod guide, reserve tube 36 and piston rod assembly 34. The end of piston rod assembly 34 opposite to piston assembly 32 is adapted to be secured to the sprung portion of vehicle 10. Valving within piston assembly 32 controls the movement of fluid between upper working chamber 44 and lower working chamber 46 during movement of piston assembly 32 within pressure tube 30. Because piston rod assembly 34 extends only through upper working chamber 44 and not lower working chamber 46, movement of piston assembly 32 with respect to pressure tube 30 causes a difference in the amount of fluid displaced in upper working chamber 44 when compared with the amount of fluid displaced in lower working chamber 46. This difference in the amount of fluid displaced is the rod volume and it flows through base valve assembly 38.

Reserve tube 36 surrounds pressure tube 30 to define a reserve chamber 54 located between the tubes. The bottom end of reserve tube 36 is closed by an end cap 56 which is adapted to be connected to the unsprung portion of vehicle 10. The upper end of reserve tube 36 is attached to the upper rod guide by mechanically deforming the open end of reserve tube 36 to form a retaining flange or by other means known in the art. Base valve assembly 38 is disposed between lower working chamber 46 and reserve chamber 54 to control the flow of fluid, the rod volume of fluid, between the two chambers. When shock absorber 26 extends in length (rebound), an additional amount of fluid is needed in lower working chamber 46. Thus, fluid will flow from reserve chamber 54 to lower working chamber 46 through base valve assembly 38. When shock absorber 26 shortens in length (compression), an excess of fluid must be removed from lower working chamber 46. Thus, fluid will flow from lower working chamber 46 to reserve chamber 54 through base valve assembly 38. The damping characteristics for shock absorber 20 during an extension stroke are controlled by the valving in piston assembly 32 and the damping characteristics for shock absorber 20 during a compression stroke are controlled by valving in base valve assembly 38.

Figure 3:
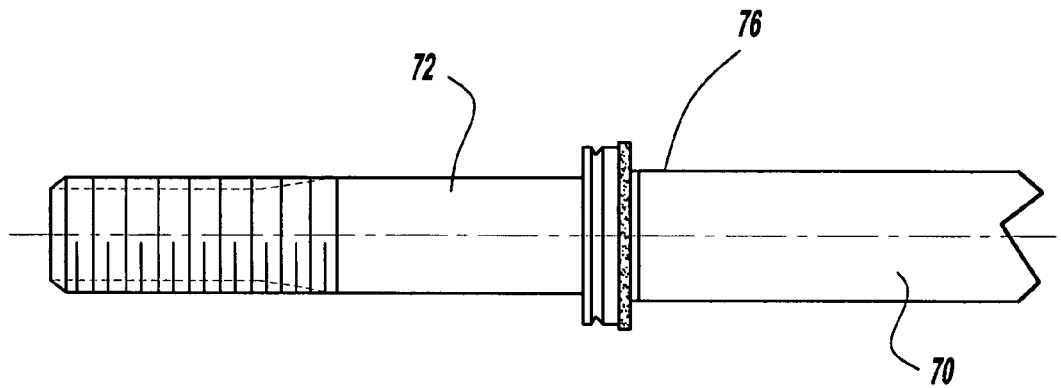
FIG. 3 is an enlarged view after the first welding operation in accordance with the present disclosure.
Figure 4:
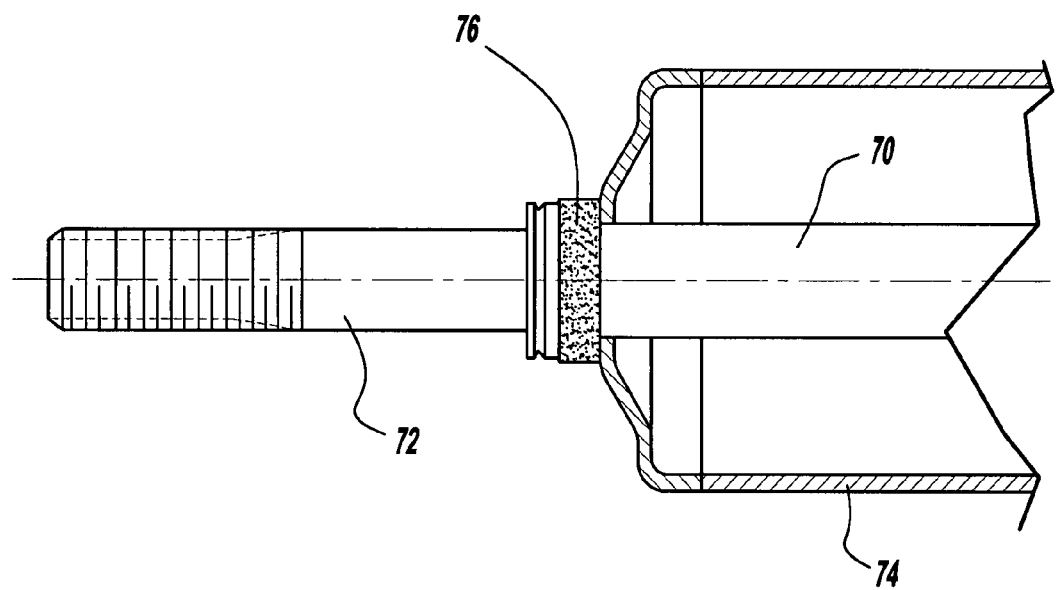
FIG. 4 is an enlarged cross-sectional view after the second welding operation in accordance with the present disclosure.

Piston rod assembly 34 comprises a lower piston rod portion 70, an upper piston rod portion 72 and a dust or dirt shield 74. Piston rod assembly is manufactured using a two weld operation. First, a resistance/friction weld is performed in order to attach lower piston rod portion 70 to upper piston rod portion 72 as illustrated in FIG. 3. As illustrated in FIG. 3, this first weld welds only lower piston rod portion 70 to upper piston rod portion 72. This first welding operation creates a disturbed area of piston rod assembly 34 as indicated by reference numeral 76. Second, dirt or dust shield 74 is assembled to the welded upper and lower piston rod portions 70 and 72 and a MIG or MAG welding operation is performed as illustrated in FIG. 4. The MIG or MAG welding operation is done at disturbed area 76 and it simultaneously welds lower piston rod portion 70, upper piston rod portion 72 and dust or dirt shield 74. The MIG or MAG weld extends completely around piston rod assembly 34. While upper piston rod portion 72 is illustrated as a stem, it is within the scope of the present invention to have an attachment loop as upper piston rod portion 72.

The advantages for this two weld piston rod assembly 34 include that the connection between upper piston rod portion 72 and dust or dirt shield 74 is completely sealed and thus it does not lead to rust bleeding as is seen on the prior art designs. The prior art designs sometimes see rust water appearing between the upper piston rod portion, the dirt or dust shield and the prior art MIG/MAG welds. The two weld piston rod assembly 34 is lower in cost because of the elimination of one welding process and it is much easier to spray paint the shock absorber due to a smaller Farady cage effect. The two weld piston rod assembly 34 has superior static and dynamic strength and the MIG or MAG weld completely covers any notch that may remain after the first resistance/ friction weld. Also since the MIG or MAG weld for piston rod assembly 34 is done above dirt or dust shield 74, no weld spatter will appear on lower piston rod portion 72 which strokes into shock absorber 26 past the sealing system. Any weld spatter on lower piston rod portion 72 can lead to quality and/or durability issues for the sealing system and for shock absorber 26.

What is claimed is:

1. A shock absorber comprising:
a pressure tube defining a working chamber;
a piston assembly disposed within said working chamber, said piston assembly dividing said working chamber into an upper working chamber and a lower working chamber;
a piston rod assembly attached to said piston assembly, said piston rod assembly extending from said piston assembly through one end of said pressure tube, said piston rod assembly comprising:
an upper piston rod portion;
a lower piston rod portion attached to said upper piston rod portion;
a dirt shield attached to said upper piston rod portion and said lower piston rod portion;
a first weld attaching only said upper piston rod portion to said lower piston rod portion; and
a second single weld covering the first weld and simultaneously attaching said dirt shield to both said upper piston rod portion and said lower piston rod portion and attaching said upper piston rod portion to said lower piston rod portion.

2. The shock absorber according to claim 1, wherein said first weld creates a disturbed area on said piston rod assembly adjacent said first weld, said second weld being disposed in said disturbed area.

3. The shock absorber according to claim 2, wherein said first weld is one of a resistance weld and a friction weld.

4. The shock absorber according to claim 3, wherein said second weld is one of a MIG weld and a MAG weld.

5. The shock absorber according to claim 1, wherein said first weld is one of a resistance weld and a friction weld.

6. The shock absorber according to claim 5, wherein said second weld is one of a MIG weld and a MAG weld.

7. The shock absorber according to claim 1, wherein said second weld is one of a MIG weld and a MAG weld.

8. The shock absorber according to claim 1, wherein said shock absorber further comprises:
a reserve tube disposed around said pressure tube, a reserve chamber being defined between said pressure tube and said reserve tube; and
a base valve assembly disposed between said working chamber and said reserve chamber.

9. The shock absorber according to claim 8, wherein said first weld creates a disturbed area on said piston rod assembly, said second weld being disposed in said disturbed area.

10. The shock absorber according to claim 9, wherein said first weld is one of a resistance weld and a friction weld.

11. The shock absorber according to claim 10, wherein said second weld is one of a MIG weld and a MAG weld.

12. The shock absorber according to claim 8, wherein said first weld is one of a resistance weld and a friction weld.

13. The shock absorber according to claim 8, wherein said second weld is one of a MIG weld and a MAG weld.

14. The shock absorber according to claim 13, wherein said first weld is one of a resistance weld and a friction weld.

15. A method for manufacturing a piston rod assembly comprising:
creating a first weld by welding only an upper piston rod to a lower piston rod a first time;
assembling a dirt shield to the upper piston rod and the lower piston rod after creating the first weld;
creating a second weld covering said first weld and simultaneously welding the dirt shield to said upper piston rod and said lower piston rod and welding said upper piston rod to said lower piston rod a second time.

16. The method for manufacturing a piston rod assembly according to claim 15, wherein the step of welding said upper piston rod to said lower piston rod a first time creates a weld with a disturbed area on said piston rod adjacent said weld, the method further comprising locating said simultaneously welding of said dirt shield at said disturbed area.

17. The method for manufacturing a piston rod assembly according to claim 16, wherein the step of welding said upper piston rod to said lower piston rod a first time includes one of friction welding and resistance welding.

18. The method for manufacturing a piston rod assembly according to claim 17, wherein the step of simultaneously welding said dirt shield includes one of a MIG weld and a MAG weld.

19. The method for manufacturing a piston rod assembly according to claim 15, wherein the step of welding said upper piston rod to said lower piston rod a first time includes one of friction welding and resistance welding.

20. The method for manufacturing a piston rod assembly according to claim 19, wherein the step of simultaneously welding said dirt shield includes one of a MIG weld and a MAG weld.

* * * * *